United States Patent [19]

Kraushaar et al.

[11] 4,329,261

[45] May 11, 1982

[54] LIQUID BAND PASS FILTERS

[75] Inventors: Robert J. Kraushaar, Tenafly, N.J.;
Kevin B. Ward, Bayside, N.Y.

[73] Assignee: International Standard Electric Corporation, New York, N.Y.

[21] Appl. No.: 125,431

[22] Filed: Feb. 28, 1980

[51] Int. Cl.$^3$ .............................................. G02B 5/24
[52] U.S. Cl. .................................. 252/582; 252/589; 350/312
[58] Field of Search ................. 252/589, 582; 350/312

[56] References Cited

U.S. PATENT DOCUMENTS 2,128,110  8/1938  Wilson ................................ 350/312
3,801,179  4/1974  Wisse et al. ........................ 252/300

OTHER PUBLICATIONS

Braga et al., "A Band Pass Filter . . . " *J. Sci. Instrum.*, 1966, vol. 43, pp. 341–342.
Kasha, M., "Transmission Filters for the Ultraviolet" *J. Opto. Soc. Am.* 38(11) (Nov. 1948) pp. 929–934.

*Primary Examiner*—Deborah L. Kyle
*Attorney, Agent, or Firm*—John T. O'Halloran; Peter C. Van Der Sluys

[57] ABSTRACT

Solutions of 2,7-dimethyl-diaza-(3,6)-cycloheptadien-(1,6)- perchlorate are used as liquid band pass filters for the transmission of U-V.

2 Claims, 2 Drawing Figures

LIQUID BAND PASS FILTERS

BACKGROUND OF THE INVENTION

1. Field of the Invention

The invention relates to liquid, band pass filters and more particularly relates to the use of 2,7-dimethyl-diaza-(3,6)-cycloheptadien-(1,6)-perchlorate solutions as such optical filters.

2. Brief Description of the Prior Art

The compound 2,7-dimethyl-diaza-(3,6)-cycloheptadien-(1,6)-perchlorate (sometimes referred to in the art as "Cation X") has been used prior to my invention as a component of the well known "Barr filter". The Barr filter is a solid type of band pass filter which comprises a suspension of the "Cation X" in a thin film of polyvinyl alcohol.

The prior art Barr filters are not satisfactory for all purposes as ultraviolet transmission filters since random variations in the polyvinyl alcohol film thickness prevents one from obtaining a controlled concentration of the suspended Cation X over a given surface area. Further, the polyvinyl alcohol component of the filter may produce undesirable absorption of light waves in certain pass bands of interest.

I have found that the above-described problems of the Barr filters are avoided by the use of the Cation X in solution, preferably a glycerol solution.

The corresponding 2,7-dimethyl-diaza-(3,6)-cycloheptadien-(1,6)-iodide has been employed in an aqueous solution as a liquid band pass filter; see Kasha, JOSA, 38 No. 11, page 929 (November 1948).

SUMMARY OF THE INVENTION

The invention comprises a method of filtering light to selectively transmit ultraviolet, which comprises: inserting in the path of said light a band pass filter which comprises a solution of 2,7-dimethyl-diaza-(3,6)-cycloheptadien-(1,6)-perchlorate.

The invention also comprises a liquid band pass optical filter which comprises a glycerol solution of 2,7-dimethyl-diaza-(3,6)-cycloheptadien-(1,6)-perchlorate.

DETAILED DESCRIPTION OF THE INVENTION

The compound 2,7-dimethyl-diaza-(3,6)-cycloheptadien-(1,6)-perchlorate is a well known compound as is its preparation; see Schwartzenback et al., Helvetia Chima Acta, 23, 1139 (1940). This compound is employed to prepare the pass band filters of the invention by dissolving it in glycerol. The concentration of the compound in solution may be within the range of from about 0.1 grams/liter to about 2.0 grams/liter of glycerol.

The method of the invention is not limited to the filtration of lightwaves with glycerol solutions of the 2,7-dimethyl-diaza-(3,6)-cycloheptadien-(1,6)-perchlorate. Any solution of the compound may be employed, including for example, water and like solutions of the compound. Any solvent may be used, preferably colorless or near-colorless solvents. The concentration of the 2,7-dimethyl-diaza-(3,6)-cycloheptadien-(1,6)-perchlorate in such solvents is advantageously within the range of from about 0.1 grams/liter to about 2.0 grams/liter.

The following examples describe the manner and method of making and using the invention and set forth the best mode contemplated by the inventor but are not to be construed as limiting.

EXAMPLE 1

An optical filter solution is made by dissolving 0.5 gms. of 2,7-dimethyl-diaza-(3,6)-cycloheptadien-(1,6)-perchlorate in 1 liter of glycerol.

EXAMPLE 2

The ultraviolet transmission characteristics of the filter solution prepared in Example 1, supra., is measured by passing light waves from a high pressure quartz mercury arc fitted spectrophotometer through the filter. The absorption curve observed (absorption coefficients) for the filter is shown graphically by the solid line in FIG. 1 of the accompanying drawings. For comparative purposes, the FIG. 1 also shows graphically the partial absorption curve (in the broken-line) for a filter solution of 2,7-dimethyl-diaza-(3,6)-cycloheptadien-(1,6)-iodide (0.2 gms.) in 1 liter of water as reported by Kasha, supra.

Figure 1:
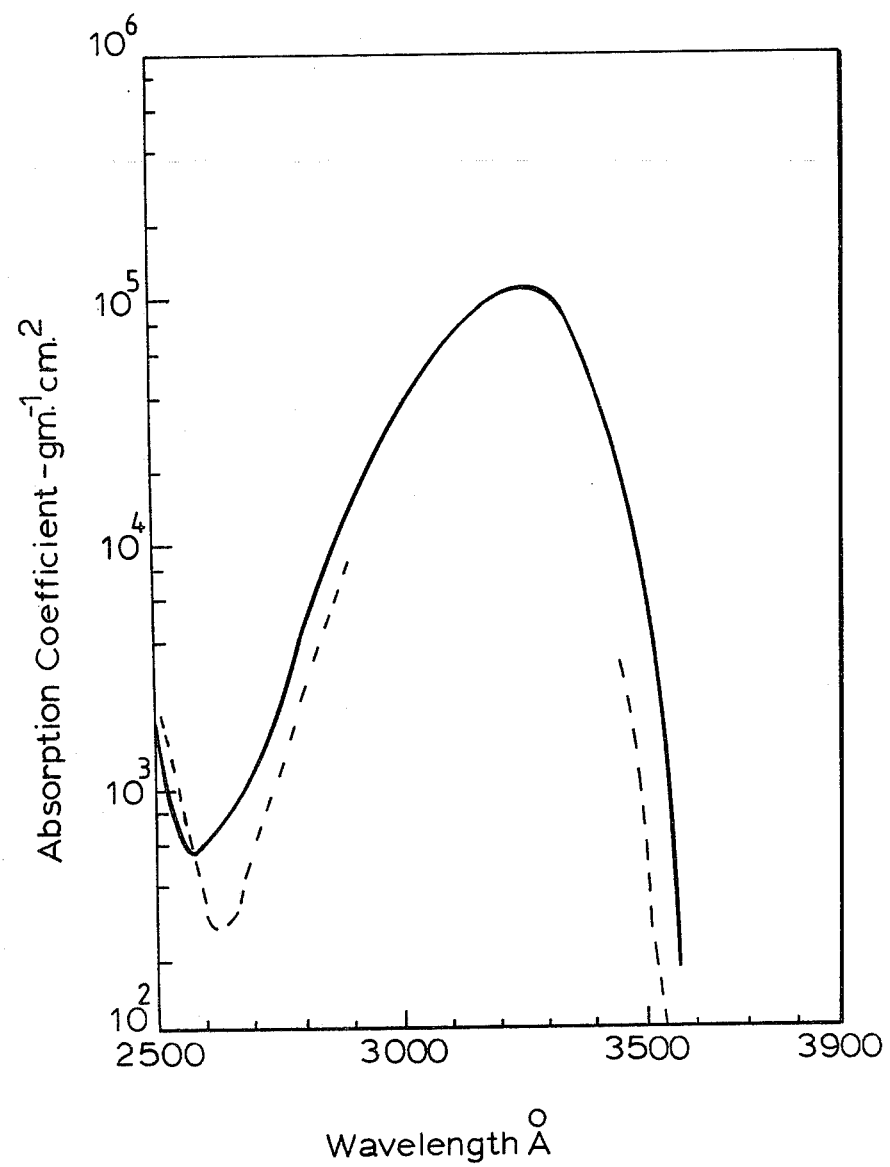
FIG. 1 is a graphical representation of the ultraviolet transmission characteristics of the liquid band pass filter of the invention in comparison to the prior art 2,7-dimethyl-diaza-(3,6)-cycloheptadien-(1,6)-iodide solution filter.

From the FIG. 1, those skilled in the art will appreciate the effectiveness of the band pass filter of the invention, in terms of the more than two orders of magnitude change in the attenuation coefficient between the minimum absorption at 2575 Å and the maximum absorption at 3200 Å.

EXAMPLE 3

An optical filter of the solution is prepared by dissolving 0.2 gms. of 2,7-dimethyl-diaza-(3,6)-cycloheptadien-(1,6)-perchlorate in 1 liter of glycerol, in a cell 1 mm. thick.

EXAMPLE 4

The optical filter solution of Example 3 is examined for its spectral transmission characteristics. The result is shown graphically in FIG. 2 of the accompanying drawings by the dotted line. For comparative purposes, the transmission characteristics of a Barr filter (a film of polyvinyl alcohol containing $\approx$0.1 percent of 2,7-dimethyl-diaza-(3,6-cycloheptadien-(1,6)-perchlorate) was also examined. The results of the latter examination are shown by the solid line in FIG. 2.

Figure 2:
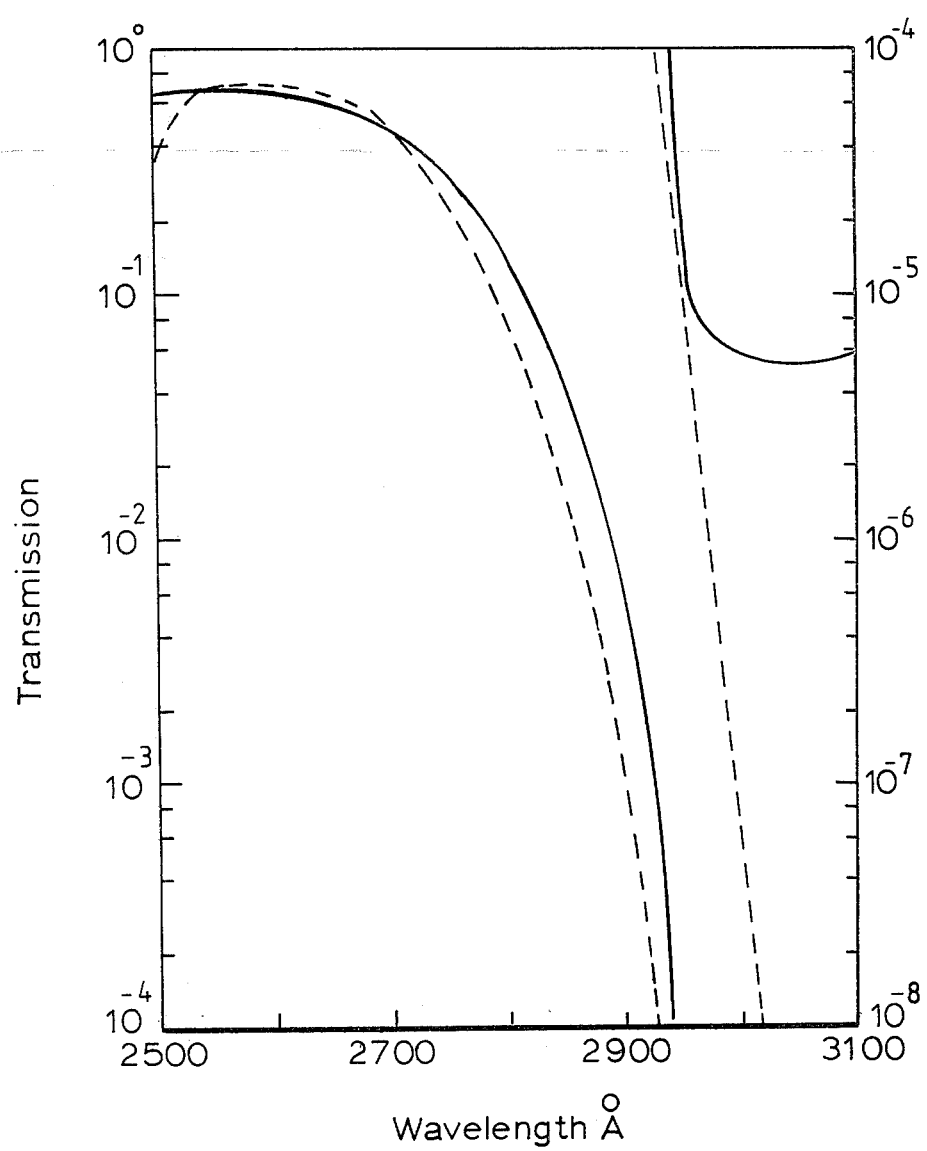
FIG. 2 is a graphical representation of the ultraviolet transmission characteristics of the liquid band pass filter of the invention in comparison to a prior art Barr filter.

Those skilled in the art will appreciate from the FIG. 2 that the U-V transmission character of the filter of the invention is significantly better than obtained with the Barr filter.

It will also be appreciated that the use of 2,7-dimethyl-diaza-(3,6)-cycloheptadien-(1,6)-perchlorate solution provides a filter component which may be introduced in a portion of the remaining matrix of filter elements as an inter-element coupling fluid, thereby simultaneously reducing the existing surface reflection losses without introducing additional absorption losses.

We claim:

1. A method of filtering light to selectively transmit ultraviolet, which comprises; inserting in the path of said light a band pass filter which comprises a glycerol solution of 2,7-dimethyl-diaza-(3,6)-cycloheptadien-(1,6)-perchlorate having a concentration in the range of 0.1 grams per liter to 2.0 grams per liter.

2. A glycerol solution of 2,7-dimethyl-diaza-(3,6)-cycloheptadien-(1,6)-perchlorate having a concentration in glycerol in the range of 0.1 grams per liter to 2.0 grams per liter.

* * * * *